US008330593B2

(12) United States Patent
Golenski

(10) Patent No.: US 8,330,593 B2
(45) Date of Patent: Dec. 11, 2012

(54) MONITORING VEHICLE ACTIVITY

(75) Inventor: Stephen S. Golenski, Dalton, PA (US)

(73) Assignee: Ease Diagnostics, Olyphant, PA (US)

( * ) Notice: Subject to any disclaimer, the term of this patent is extended or adjusted under 35 U.S.C. 154(b) by 656 days.

(21) Appl. No.: 12/422,475

(22) Filed: Apr. 13, 2009

(65) Prior Publication Data

US 2009/0256690 A1 Oct. 15, 2009

Related U.S. Application Data

(60) Provisional application No. 61/044,276, filed on Apr. 11, 2008, provisional application No. 61/044,285, filed on Apr. 11, 2008, provisional application No. 61/044,307, filed on Apr. 11, 2008.

(51) Int. Cl.
*B60Q 1/00* (2006.01)

(52) U.S. Cl. ........ 340/438; 340/439; 340/442; 340/444; 340/447; 340/505; 340/988; 340/989; 701/36; 701/45

(58) Field of Classification Search .................. 340/438, 340/439, 442, 444, 447, 505, 988, 989; 701/35, 701/45
See application file for complete search history.

(56) References Cited

U.S. PATENT DOCUMENTS

| | | | | |
|---|---|---|---|---|
| 5,223,844 A * | 6/1993 | Mansell et al. | 342/357.31 |
| 5,613,223 A | 3/1997 | Ross et al. | |
| 5,686,910 A | 11/1997 | Timm et al. | |
| 5,914,675 A * | 6/1999 | Tognazzini | 340/989 |
| 6,091,324 A | 7/2000 | Arsenault et al. | |
| 6,211,818 B1 | 4/2001 | Zach, Sr. | |
| 6,340,928 B1 | 1/2002 | McCurdy | |
| 6,917,801 B2 | 7/2005 | Witte et al. | |
| 6,970,703 B2 | 11/2005 | Fuchs et al. | |
| 7,113,127 B1 | 9/2006 | Banet et al. | |
| 7,119,669 B2 | 10/2006 | Lundsgaard et al. | |
| 7,158,016 B2 | 1/2007 | Cuddihy et al. | |
| 7,266,435 B2 | 9/2007 | Wang et al. | |
| 7,312,696 B2 | 12/2007 | Flick | |
| 7,336,933 B2 | 2/2008 | Davis et al. | |
| 7,589,883 B2 | 9/2009 | Varaprasad et al. | |
| 2003/0103482 A1 | 6/2003 | Van Bosch | |
| 2003/0139179 A1 | 7/2003 | Fuchs et al. | |
| 2003/0199260 A1 | 10/2003 | Casey et al. | |
| 2004/0264387 A1 | 12/2004 | Gibeau | |
| 2005/0040944 A1 | 2/2005 | Contestabile | |
| 2005/0240343 A1 | 10/2005 | Schmidt, II et al. | |
| 2006/0190162 A1 | 8/2006 | Ampunan et al. | |
| 2006/0271246 A1 | 11/2006 | Bell et al. | |
| 2007/0082614 A1 | 4/2007 | Mock | |
| 2008/0132270 A1 | 6/2008 | Basir | |
| 2008/0292146 A1 | 11/2008 | Breed et al. | |
| 2009/0061852 A1 | 3/2009 | Feher | |

* cited by examiner

*Primary Examiner* — Tai T Nguyen
(74) *Attorney, Agent, or Firm* — Pepper Hamilton LLP

(57) ABSTRACT

A method of monitoring a vehicle. The method includes the steps of establishing a first wireless connection between a first portable wireless device and a vehicle communications system thereby creating a data transfer network between the first portable wireless device and the vehicle communications system, monitoring, by the vehicle communications system, at least one sensor for a specific vehicle activity, and if the specific vehicle activity occurs, sending a notification via the wireless connection from the vehicle communications system to the first portable wireless device via the data transfer network.

14 Claims, 7 Drawing Sheets

MONITORING VEHICLE ACTIVITY

CROSS-REFERENCE TO RELATED APPLICATIONS

This application claims the priority benefit of U.S. Provisional Application No. 61/044,276, U.S. Provisional Application No. 61/044,285, and U.S. Provisional Patent Application No. 61/044,307, each of which was filed on Apr. 11, 2008.

NOT APPLICABLE

BACKGROUND

This document relates to monitoring vehicle activity, and more particularly to utilizing a wireless device to communicate with a vehicle and monitor activities related to the vehicle.

As wireless communications have improved, wireless communication implementations have expanded beyond merely personal communications. One area where wireless communications have been implemented recently is in vehicular based communications, specifically communication systems where information relating to a specific vehicle are collected and transmitted from the vehicle to a central collection agency. One example of this implementation is the OnStar® system.

OnStar functions by integrating a wireless communication device into a vehicle along with a global positioning system (GPS) and several additional sensors. A driver or passenger in the vehicle uses this device to directly contact an OnStar operator for various services, e.g., obtaining directions or information about the area the vehicle is in based upon the GPS. OnStar also provides a collision detection feature where the OnStar operator is contacted if the vehicle has been in a crash. For example, a vehicle sensor may monitor whether a vehicle's airbags have deployed which could indicate a crash situation such as a frontal collision, a side impact, a rollover, etc. In the event of airbag deployment, an OnStar operator may be contacted, and the OnStar operator may follow a set of protocols such as contacting the police or emergency medical services.

Typical vehicle based wireless communication systems, such as OnStar, have their drawbacks. One such drawback is the communication device is integrated into the vehicle, i.e., the device is not removable from the vehicle for portable use in other applications. This requires each vehicle covered by the system to have an individual communication device. Another drawback is difficulty in converting vehicles without communication systems or upgrading the systems as technologies become obsolete. For example, all analog versions of OnStar were deactivated on Feb. 18, 2008. This required all OnStar users with the analog system in their vehicle to either update to a digital version of OnStar, or end their service for that particular vehicle. Similarly, many collision detection systems detect airbag deployment as an indication of a collision, however, many older vehicles do not include airbags. Additionally, these communications devices work with vehicles having an integrated electronic diagnostic system (e.g., a series of sensors and other electronics used to monitor the current status of a vehicle), and are not compatible with vehicles without such systems, e.g., a bicycle.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "vehicle" is a reference to one or more vehicles and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In one general respect, the embodiments disclose a method of monitoring a vehicle. The method includes the steps of establishing a first wireless connection between a first portable wireless device and a vehicle communications system thereby creating a data transfer network between the first portable wireless device and the vehicle communications system, monitoring, by the vehicle communications system, at least one sensor for a specific vehicle activity, and if the specific vehicle activity occurs, sending a notification via the wireless connection from the vehicle communications system to the first portable wireless device via the data transfer network.

In another general respect, the embodiments disclose a method of monitoring a vehicle. The method includes the steps of establishing a first wireless connection between a first wireless device and a vehicle communications system thereby creating a data transfer network between the first portable wireless device and the vehicle communications system, establishing a second wireless connection between a second wireless device and the first wireless device, monitoring, by the vehicle communications system, at least one sensor for a specific vehicle activity, if the specific vehicle activity occurs, sending a notification from the vehicle communications system to the first wireless device, and transmitting the notification from the first wireless device to the second wireless device.

BRIEF DESCRIPTION OF THE DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 1:
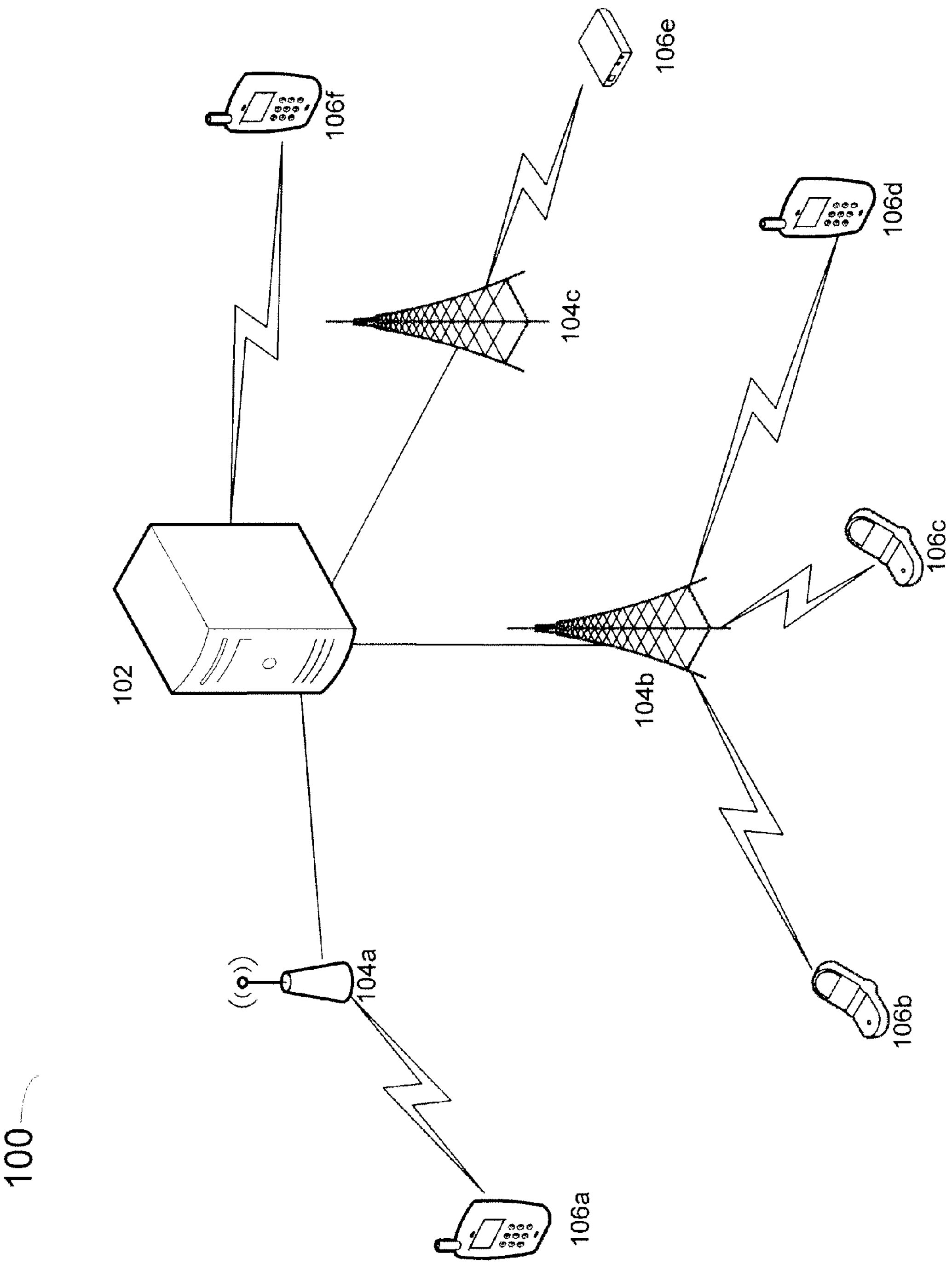
FIG. 1 illustrates an exemplary wireless communications network.

FIG. 1 illustrates an exemplary wireless communications network 100. The wireless communications network 100 may include a server 102 configured to control access to the wireless communications network, as well as control the routing and flow of data between devices connected to the wireless communications network. Various wireless access points 104*a*, 104*b* and 104*c* may be operably connected to the server 102. It should be noted that a single server 102 is shown for exemplary purposes only. Two or more servers may be used such as web servers, file servers, FTP servers, cell phone carrier servers, vehicle diagnostic servers, etc. The multiple servers may be arranges such that load balancing is incorporated, resulting in shared processing across the multiple servers. The connections between the server 102 and the wireless access points 104*a-c* may be wired connections (e.g., fiber optic or coaxial cable), or the connections may be wireless depending on the application and infrastructure of the wireless communications network 100.

Wireless access points 104*a-c* may be short range wireless access points such as a city-wide WI-FI network (e.g., wireless access point 104*a*), or larger range wireless access points such as cellular or radio signal towers (e.g., wireless access points 104*b* and 104*c*). Various wireless devices 106*a-e* may be operably connected via a wireless communications link to the wireless access points 104*a-c*. The wireless devices 106*a-e* may include various data transmitting and receiving devices such as personal digital assistants (PDAs) or smart phones (e.g., wireless devices 106*a* and 106*d*), cellular phones (e.g., wireless devices 106*c* and 106*d*), or a wireless communications device having either a built in wireless modem or network communications card (e.g., wireless device 106*c*). The wireless device 106*e* may be, for example, integrated into a vehicle equipped with an on-board vehicle diagnostic system, and configured to communicate between the vehicle's diagnostic system and the remote server (e.g., server 102) running and managing a vehicle monitoring system. Similarly, a remote device 106*f* may establish a direct connection to server 102 without utilizing one of wireless access points 104*a-c*. It should be noted that remote device 106*f* may be a desktop PC or PDA that may establish a direct wired connection with server 102 as well as a wireless device that may establish a direct wireless connection with server 102.

It should be noted that the various components of the wireless communications network 100 are shown merely by way of example, and may be substituted based upon the topology and application of the wireless communications network. For example, additional wireless devices may be used such as notebook computers and hand-held data transfer devices without telephone capabilities.

Figure 2:
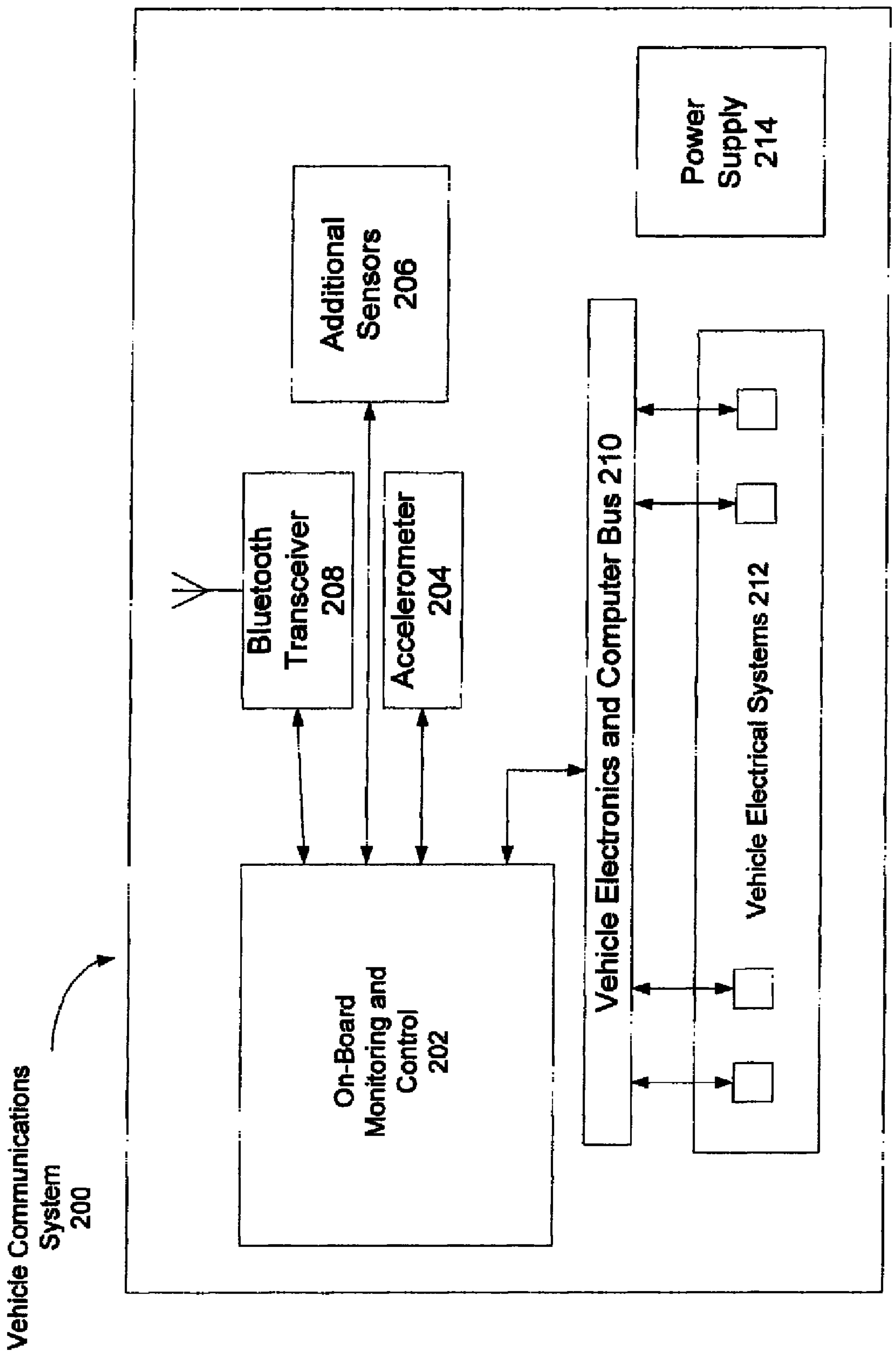
FIG. 2 illustrates various embodiments of a vehicle based communications system.

FIG. 2 illustrates an exemplary vehicle communications system 200. The vehicle communications system 200 may be an integrated system for measuring various operational parameters and performance related statistics and information for a vehicle and reporting these statistics to a wireless device via a wireless connection. A user using the wireless device may, in response to a notification from the vehicle communications system 200, respond via the wireless device and provide further instructions. The vehicle communications system 200 may be adapted beyond notification purposes, however, as the vehicle communications system may be used for information gathering and reporting as well.

The vehicle communications system 200 may include an On-Board Monitoring and Control (OBMC) system 202. The OBMC 202 may be electrically connected to an accelerometer 204. The accelerometer 204 may measure any G forces being applied to the vehicle in each of 3 axes (i.e., X, Y and Z axes). By measuring three axes of applied G forces, the accelerometer 204 may provide collected data that may be analyzed to determine what type of event has occurred to cause the G forces. For example, in the event of a head-on crash, by combining the measurements from each the X, Y and Z axis, the OBMC 202 may determine the severity of the crash by summing each of the three measured G forces. The information collected by the accelerometer 204 may be reported to the OBMC 202 periodically, and the OBMC 202 may monitor the data for any significant changes that would indicate a serious event such as a crash. The OBMC 202 may be electrically connected to a series of additional sensors 206. The additional sensors 206 may monitor additional operational and performance related statistics and may periodically report these operational and performance related statistics to the OBMC 202. Examples of the additional sensors 206 may include speed monitors, temperature gauges (e.g., thermocouples), fuel gauges, a global positioning system (GPS), etc.

The OBMC 202 may monitor the information reported by the additional sensors 206 for any significant changes. For example, a quick change in engine temperature may indicate a serious engine problem. The OBMC 202 may continuously, or periodically and regularly, monitor the information being reported from the additional sensors 206. The OBMC 202 may output the monitored information to a wireless device via a wireless transceiver, in this example, Bluetooth transceiver 208. A message containing the monitored information may be transmitted from the Bluetooth transceiver 208 to a wireless device (not shown in FIG. 21 but described in more detail with relation to FIG. 4) a Bluetooth connection. The message containing the monitored information may be formatted accordingly for interpretation by software running on the wireless device. At the wireless device, the received information may be analyzed by the software running on the wireless device to determine if there are any problems or issues. In the event of a problem or issue, an alert may be displayed to a user of the wireless device indicating the current state of the vehicle.

As used herein, the term Bluetooth may include any low power, wireless personal area network in which two or more electronic device that are in close proximity to each other may connect and exchange information. Thus, the present invention is not limited to the current Bluetooth standard but includes any devices that are designed for short range, low power, wireless communications. Examples of such devices include device designed to operate according to IEEE 802.11 standards as well as the ZigBee® standard for small, low powered digital radios operating according to IEEE 802.15.4 standards. To provide for additional features, the term Bluetooth may also include higher powered cellular links such as, for example, GSM/GPRS or CDMA type interfaces.

In addition to receiving information about the current state of a vehicle on the wireless device, a user of the wireless device may send a notice to the vehicle communications system 200 instructing the OBMC 202 to perform a task. For example, if the user of the wireless device wants to remotely unlock the vehicle, the user may send a command to unlock the doors from the wireless device to the vehicle communications system 200 through Bluetooth transceiver 208. The Bluetooth transceiver 208 may relay this request to the OBMC 202. The OBMC 202 may process the request and forward a signal to a vehicle electronics and computer bus 210 to an appropriate vehicle system 212 to unlock the vehicle. Similarly, the user may send a request to open or close the vehicle's windows. Upon receiving the request, the OBMC 202 may forward an appropriate signal over the vehicle electronics and computer bus 210 to the appropriate vehicle system 212 for opening or closing the vehicle's windows. The interaction of a wireless device and the vehicle communications system 200 will become more apparent in the descriptions of the additional figures.

The vehicle communications system 200 may further include a power supply 214. The power supply 214 may be either internal or external to the system. Internal power supplies may be, for example, either disposable or rechargeable batteries. An external power supply may be supplied by the vehicle battery or another appropriate source. In the event an external power supply is used, it may be desirable to have an internal battery in case vehicle battery power is lost (e.g., if the cables are severed in a crash).

Figure 3:
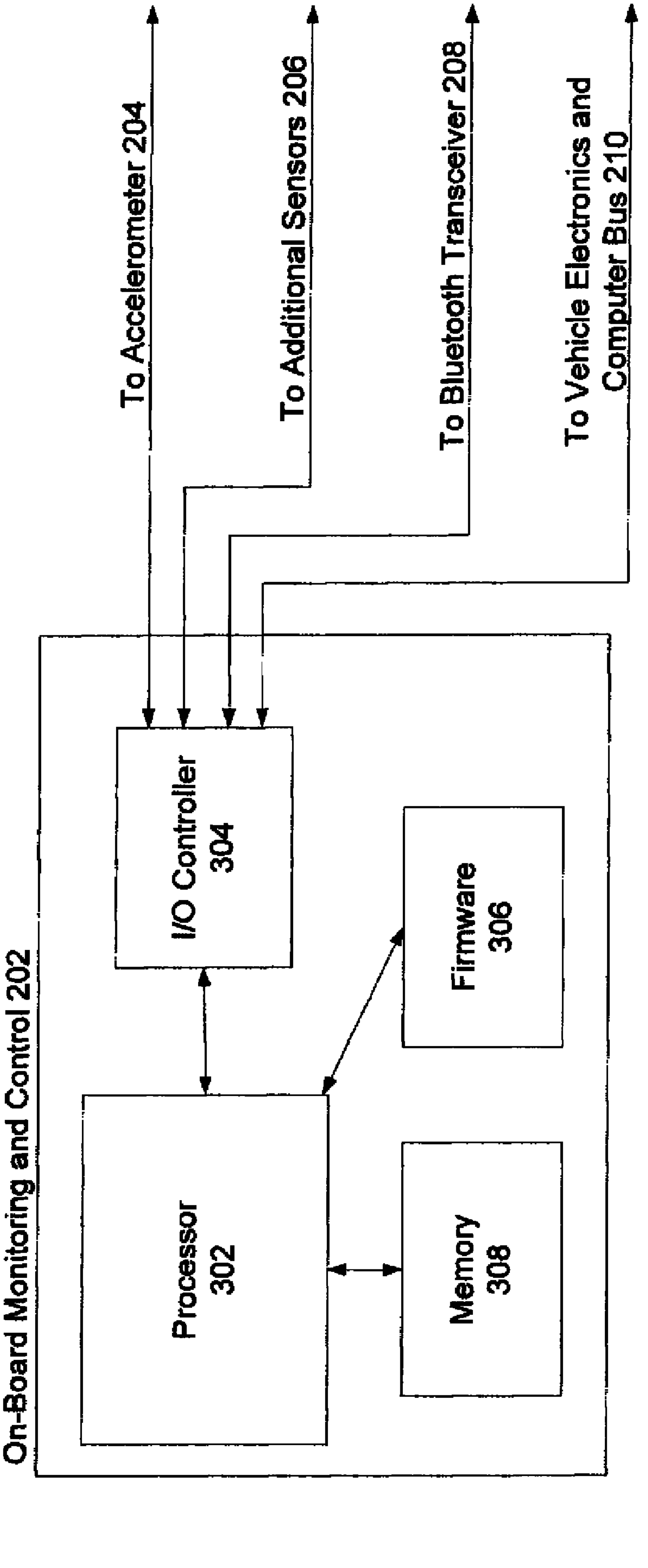
FIG. 3 illustrates a more detailed view of various embodiments of the vehicle based communications system of FIG. 2.

FIG. 3 illustrates a more detailed view of the OBMC 202 of FIG. 2. The OBMC 202 may include a processor 302, an Input/Output (I/O) interface 304, a set of firmware 306, and a memory 308. The OBMC 302 may also include a real time clock (not shown) for indicating the time an event occurs. The processor 302 may be electrically connected to each of the I/O interface 304, the firmware 306 and the memory 308. The processor 302 may function as an overall controller for the OBMC 202, running diagnostic, monitoring and control software and processing and storing results from the vehicle sensors (e.g., the accelerometer 204 and the additional sensors 206 of FIG. 2). In addition to the processor 302, the I/O interface 304 may be electrically connected to the accelerometer 204, the additional sensors 206, the Bluetooth transceiver 208 and the vehicle electronics and computer bus 210 from FIG. 2. The I/O interface 304 may function as a gateway between the vehicle sensors (e.g., the accelerometer 204 and the additional sensors 206) the Bluetooth transceiver 208 and processor 302. Data measured or detected by the vehicle sensors may be sent to the I/O interface 304 which transfers the information to processor 302 for processing.

The firmware 306 may store any software run by processor 302. The software may be split into multiple modes such as moving and non-moving software modules, depending on the application of the system. While the vehicle is moving, processor 302 may load the moving software modules from firmware 306. The moving modules may monitor the output of the vehicle sensors (primarily the accelerometer 204) for crash detection. The accelerometer 204 may report acceleration data in each of the X, Y and Z axes. When a certain acceleration threshold is exceeded, e.g., 5 Gs, the moving software module may detect a crash and the processor 302 may output an appropriate message to the I/O interface 304 for transmission to the wireless device through the Bluetooth transceiver 208.

Similarly, data obtained from the additional sensors 206 may be monitored and, when appropriate, output to the wireless device. For example, if the internal temperature of the vehicle exceeds a certain threshold, e.g. 100° F., a message may be sent to the wireless device indicating the interior temperature of the vehicle.

Memory 308 may be used to store information collected by the vehicle sensors and sent to the OBMC 202. Examples of information stored may include vehicle speed, outside temperature, and the accelerometer 208 measurements. This information may later be reported to the wireless device in the event of a crash or similar occurrence. For example, if a crash is detected, a user may look at the information stored in the memory 308 to determine what the vehicle speed was at the time of the crash. The information may also be stored merely as a data log, which may be used to prepare a report pertaining to an individual trip with information such as mileage travelled, gas mileage, data and time.

Figure 4:
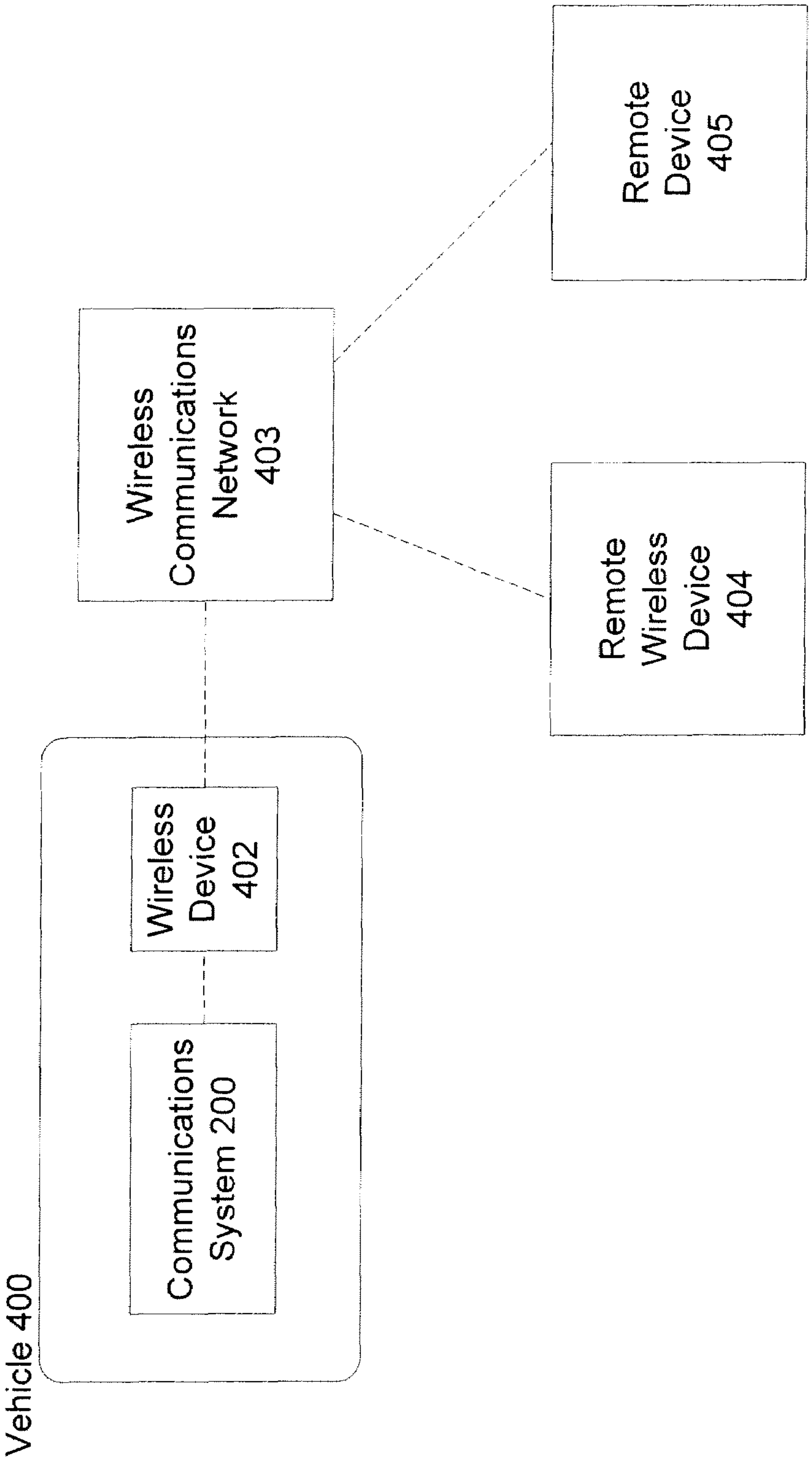
FIG. 4 further illustrates various embodiments of the vehicle based communications system of FIG. 2.

FIG. 4 illustrates an additional embodiment including vehicle communications system 200 from FIG. 2. A vehicle 400 may include the vehicle communications system 200. The vehicle communications system 200 may be operably connected to a wireless device 402. In this example, wireless device 402 may be a mobile phone connected to the vehicle communications system 200 via a Bluetooth connection, communicating with the vehicle communications system via Bluetooth transceiver 208. When a user enters vehicle 400, the user may sync the wireless device 402 and the vehicle communications system 200 according to standard Bluetooth synching procedures. The vehicle communications system 200 may include a unique Bluetooth ID for use by the wireless device 402 in establishing a Bluetooth connection. Once the Bluetooth connection is established, the user of the wireless device 402 may communicate with the vehicle communications system 200 as discussed above with respect to FIG. 2 and FIG. 3.

Wireless device 402 may generally be a multi-functional, portable device that is not integrated with the vehicle. For example, it may be a mobile phone (e.g., wireless devices 106*b* and 106*c* of FIG. 1), laptop computer, personal digital assistant (PDA) with wireless communications capabilities (e.g., wireless devices 106*a* and 106*d* of FIG. 1), etc. The wireless device includes equipment for communicating with both the wireless personal area network (e.g., Bluetooth) and a public switched telephone network (PSTN) or public Internet Protocol (IP) based packet switched network. Software may be installed on the wireless device 402 that provides an interface for the wireless device to send and receive messages from the vehicle communications system 200. The software may include a variety of modules for providing a user interface for communicating with the vehicle communications system 100. Examples of software modules may include crash detection software modules, command software modules (for sending commands to communications system, e.g., unlock the doors), and monitoring software modules.

Due to current limitations in Bluetooth technology, there is a limited distance from the vehicle 400 that the wireless device 402 can maintain a Bluetooth connection with the vehicle communications system 200. For example, once a user moves more than 10- 100 meters (depending on the Bluetooth version/class) from the vehicle 400, the Bluetooth connection is lost. To avoid this lost connection, the wireless device 402 may be left in the vehicle (or in close proximity to the vehicle) where the wireless device may function as a relay device. The wireless device 402 is left powered on maintaining the Bluetooth connection with the vehicle communications system 200. Now, the user may access communications system 200 from another wireless device, such as a remote wireless device 404. The remote wireless device 404 may connect to a wireless communications network 403 (e.g., wireless communications network 100 of FIG. 1), and communicate directly with wireless device 402 over the wireless communications network. Wireless device 402 may act as a relay by receiving the message from remote wireless device 404 (ex. lock the doors) via the wireless communications network 403 and relaying the message to the vehicle communications system 200. Conversely, a user may input the contact information for the remote wireless device 404 into the wireless device 402. Then, any messages issued from the vehicle communications system 200 (ex. a high temperature alert) is relayed by the wireless device 402 over the wireless communications network 403 to remote wireless device 404.

It should be recognized that wireless device 402 may be any device that can connect to the vehicle communications system 200 as well as receive messages from the remote wireless device 404. To continue the above example, a Bluetooth enabled cell phone may be used as well as a cellular data modem (e.g., wireless device 106*e* of FIG. 1). Similar to a cell phone, the cellular data modem may or may not be integrated into the vehicle. It should also be recognized that some or all the functions of remote wireless device 404 may also be performed by remote device 405. Remote device 405 may be an additional wireless device such as a PDA, or a wired device such as a desktop computer in communication with wireless communications network 403 (e.g., remote device 106*f* of FIG. 1).

By utilizing a relay wireless device, the range of the vehicle communications system 200 may be extended to anywhere the user may access the remote wireless device 404 and send a message to the wireless device 402 via wireless communications network 403. For example, if a person is on vacation and they have left their car parked at the airport and have left a wireless device in the car, they may receive messages from the vehicle communications system or send messages to the vehicle communications system via the relay wireless device from anywhere in the world.

It should be noted the arrangement of components in FIG. 4 is shown merely by way of example, and the components may be arranged in several manners. For example, components of communications system 200 such as the accelerometer 204 may be integrated into wireless device 402.

Figure 5:
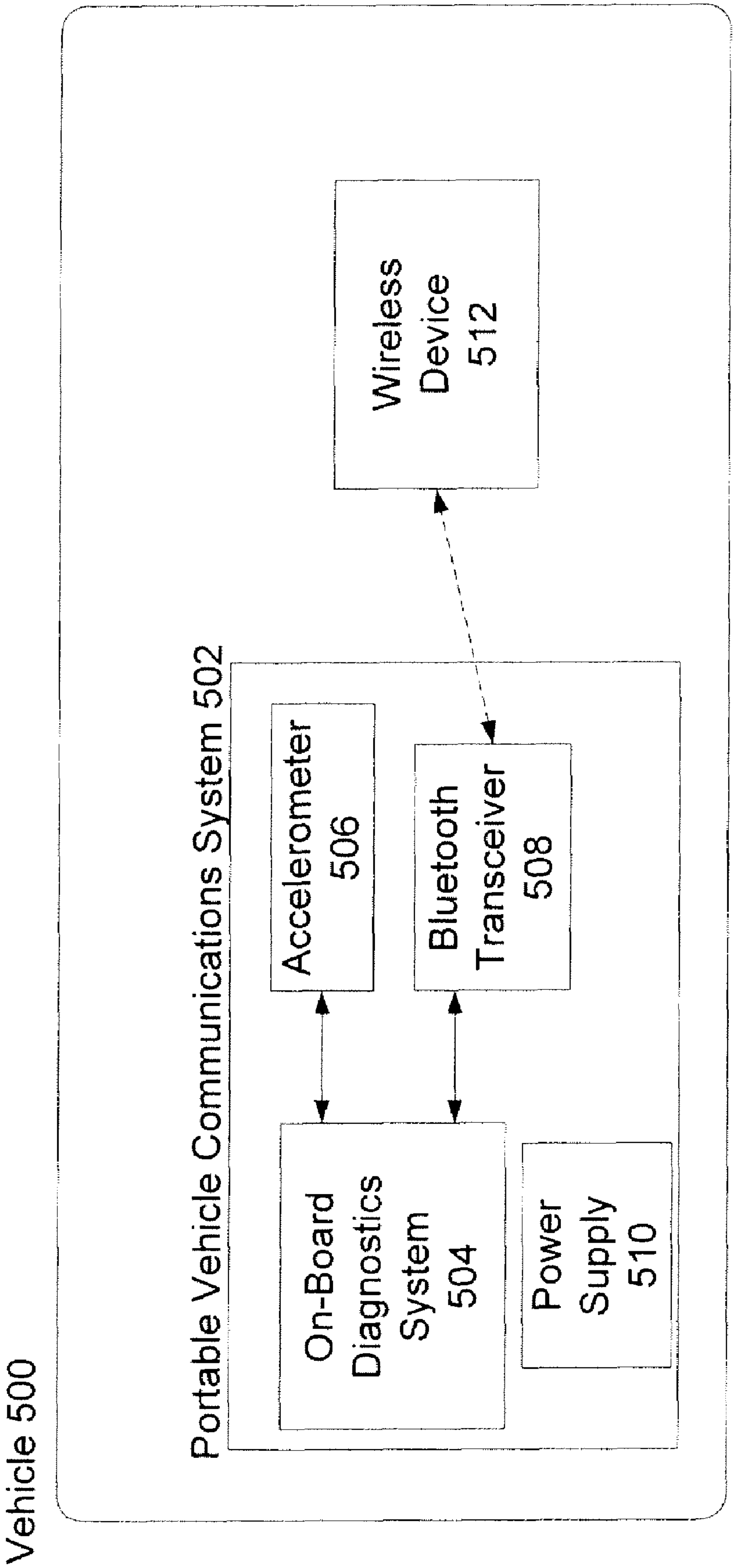
FIG. 5 illustrates various embodiments of a portable vehicle based communications system.

FIG. 5 illustrates a vehicle 500 with a portable vehicle communications system 502. The portable vehicle communications system 502 may be non-integrated with the vehicle 500 and may be moved from one vehicle to another. For example, a user may move portable vehicle communications system 502 from vehicle 400 (in FIG. 3) to vehicle 500. This allows a user, for example, to move the system from their car to a four-wheel drive all terrain vehicle. Similar to the vehicle communications system 200, the portable vehicle communications system 502 may include an on-board monitoring and control (OBMC) system 504, an accelerometer 506, a Bluetooth transceiver 508 and a power supply 510. As before, the accelerometer 506 may be a 3 axis accelerometer measuring G forces in each of the X, Y and Z axes. The accelerometer 506 may collect G force information and reported the collected information to the OBMC 504. The OBMC 504 may process this information and output it via the Bluetooth transceiver 508 to the wireless device 512 via a standard Bluetooth connection. The power supply 510 may be either an internal or external power supply. An internal supply may, for example, be either rechargeable or disposable batteries, while an external supply may be power supplied by the vehicle, for example, through an adapter plugged into a cigarette outlet.

The portable vehicle communications system 502 functions similarly to the description of vehicle communications system 200 above, with one potential exception being there may be limited sensors used with the portable vehicle communications system. As the portable vehicle communications system 502 may be transferable from vehicle to vehicle, the amount of vehicle specific information that may be collected may be limited. It should be noted, however, that additional sensors may be included such as temperature sensors as discussed above with respect to FIG. 2.

It should also be noted that the example in FIG. 5 with the wireless device 512 connected via a Bluetooth connection to the portable vehicle communications system 502 is shown merely by way of example. This arrangement of components may be arranged in several manners. For example, the accelerometer 506 may be included in the wireless device 512, and utilize the power supply and processing power of the wireless device, resulting in a single, self-contained unit the user may move from vehicle to vehicle, thus resulting in a personal protection device compatible with any vehicle the user is operating.

The vehicle communications system (both the vehicle communications system 200 and the portable vehicle communications system 502) described above may be utilized for multiple objectives. One such objective may be crash detection and reporting. One software module for installation on a user's wireless device may be a crash detection software module. This module may communicates with the vehicle communications system 200 or the portable vehicle communications system 502 and monitors for any occurrence of crashes. There may be multiple major types of crash occurrences. Two examples may include moving and non-moving crash occurrences. In a moving crash, the vehicle is traveling at some speed when the crash occurs, e.g., driving down the highway or backing a car out of a parking place and hitting another car. In a non-moving crash, the vehicle is not traveling when a crash occurs, e.g., a parked car being hit by a moving car. The multiple types of crash occurrences may be handled differently by the vehicle communication system and will be examined individually. For simplicity, the following discussion will be limited to the vehicle communications system 200. However, it should be noted that the following discussion is equally applicable to portable vehicle communications system 502.

In a moving crash, the accelerometer 204 may measure the G forces at the moment of impact during the crash and report the G-force information to the OBMC 202. The OBMC 202 may forward this information via the Bluetooth transceiver 208 to the crash detection software on the user's wireless device. Depending on the severity of the crash (as determined by the measured G forces), the crash detection software may send a message to a user's wireless device inquiring if the user is hurt. For example, a message reading "ARE YOU OK" may be displayed on the user's wireless device with two options for answering, "YES" or "NO". If the user selects "NO", or does not respond in a certain amount of time, the crash detection software may automatically instruct the wireless device to contact a call center to dispatch help. Additionally, if the vehicle is equipped with a GPS system, or otherwise has access to GPS information (e.g., if the wireless device has an integrated GPS), the crash detection software may include GPS information indicating the location of the vehicle as well in the message to the call center. If a user answers "YES", no automatic call may be made by the crash detection software.

One feature of the present invention is the portability of the wireless device. This may allow one wireless device to be used in multiple vehicles. In the scenario where the wireless device is being used in a different vehicle, the crash detection software may allow a user to customize any crash detection parameters. For example, a user may select the vehicle they are travelling in from a selection screen on the wireless device, and the crash parameters are adjusted accordingly for that vehicle.

For example, when a user is traveling in a car, the acceleration limits may be less to indicate a serious crash than if the same user is traveling in a four-wheel drive off-road vehicle. In the car, the acceleration threshold may be 5 Gs, but in the off-road vehicle the acceleration threshold may be set at 7 or 10 Gs. By allowing the software to adjust acceleration limits based upon vehicle type, a user may carry the same wireless device regardless of the vehicle they are operating, and thus access the same vehicle communications system in any vehicle.

Another feature of the crash detection software is that in the event of a crash, the crash detection software may send text messages to any wireless devices selected by the user. Similarly, emails may be sent to any selected email addresses. The software, provided the system is utilizing GPS data, may also include the nearest street address in these messages to aid a recipient in locating where the crash occurred.

It should be noted that the portable vehicle communications system 502 of FIG. 5 discussed above may provide a portable crash detection system. By including an accelerometer in a portable device, a user may carry the device from vehicle to vehicle. For example, if the user is riding a bicycle and has the portable crash detection device, in the event of a serious crash the device may register the G forces of the crash and, as above, notify others via text message or email that the user has been in an accident.

After a predetermined period during which the vehicle does not move, the communications system's monitoring and control system (e.g., OBMC 202) may automatically shift into non-moving mode. If the user of the vehicle has left the vehicle, a relay wireless device like the wireless device 402 described in FIG. 4 may be used to relay messages. If a non-moving crash occurs, the crash sensor may send a notification to the relay wireless device. The relay wireless device then may send a text message to any numbers programmed by the user to be notified. The text message may include if the vehicle is being tampered with, if the vehicle is being towed, or how severe an impact was to the vehicle.

Figure 6:
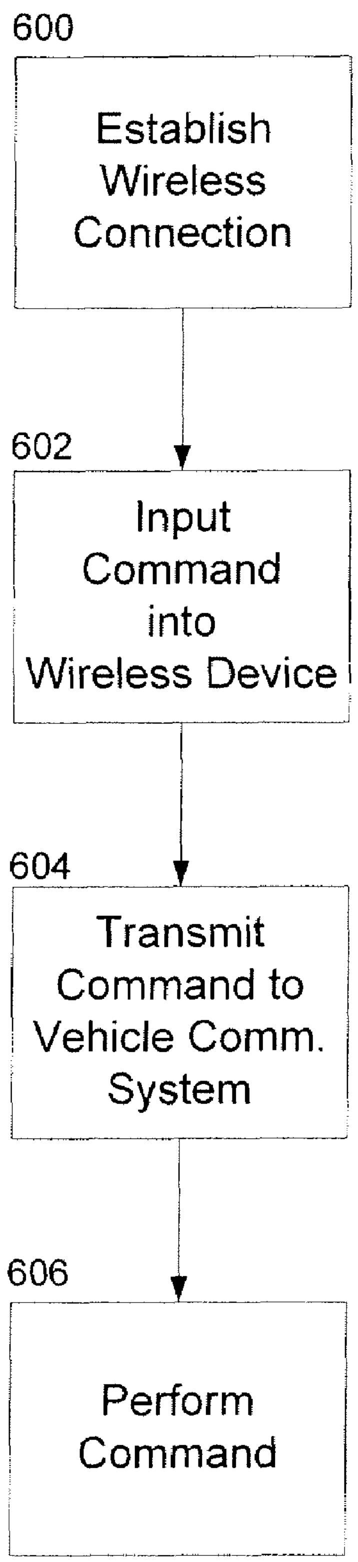
FIG. 6 illustrates a flow chart showing an exemplary process for sending commands to a vehicle.

Similar to sending commands from the OBMC to a user's wireless device, a user may send commands to the OBMC from their wireless device. FIG. 6 illustrates a flow chart showing an exemplary process for sending commands to a vehicle. Initially, the user may establish 600 a wireless connection (e.g., a Bluetooth connection as discussed above) between a wireless device and the vehicle communication system. Once the wireless connection is established, a user may input 602 a specific command into the wireless device. This may be performed by selected a command from a list of predetermined command choices stored on the wireless device, or by typing a command into the wireless device. Once the command is inputted by a user, the wireless device may transmits 604 the command to the vehicle communications system. Once the vehicle communications system receives the command, the command may be performed 606 by the vehicle communication system. Additionally, security options may be included in the system if a user is accessing the system remotely. For example, the user may have to enter a specific user password/biometric ID or other unique identifier.

One example of a command transmitted from a user's wireless device to a vehicle is to lock/unlock the vehicle. If, for example, a user locks their keys in their car but has their wireless device, the user may simply send a message from the wireless device to the OBMC to unlock the car. If, by chance, the user left their wireless device in the car as well, the user may send a message (including, if needed, the user password) from another wireless device to their wireless device in the car, and the device in the car may relay the message to the OBMC to unlock the doors. Similarly, a user may lock their car with their wireless device. If there is a relay wireless device in the vehicle, a user may lock the vehicle from anywhere by sending a message to the relay phone in the car and having the phone in the car relay the message to the OBMC to lock the vehicle.

Similar commands may be sent from a user's wireless device to the OBMC to start the car, activate the alarm, sound the horn, flash the headlights, turn on the heat or air conditioning, or open the windows. The vehicle communication system may also use a bi-directional control built into the vehicle to control additional electrical systems not on the vehicle bus. For example, the communications system may command a relay to turn on in the vehicle. This relay may drive/control another device in the vehicle. For example, in some vehicles, the door unlock command is not on the vehicle bus and thus cannot be activated with a command as described above. There are three types of door unlock types: 1) those that have a connection on the vehicle data bus and will respond with the ignition key in an off position; 2) those that have a connection on the vehicle data bus, but will not respond with the ignition key in an off position; and 3) those that do not have a message on the bus, but do have electrical door locks. Type 1 will function as already described above. Type 2 may use additional circuitry to simulate the ignition key is in the on position, then the unlock command may be sent. Type 3 may also use additional circuitry, but different than the circuitry for Type 2. A direct unlock circuit may be used to send the command to the vehicle locks, bypassing the vehicle electrical bus.

Another objective of the above described vehicle communications system may be vehicle monitoring. Above and beyond simple monitoring for the occurrence of crash events, the system may be used to monitor many other aspects of the vehicle and its performance.

Figure 7:
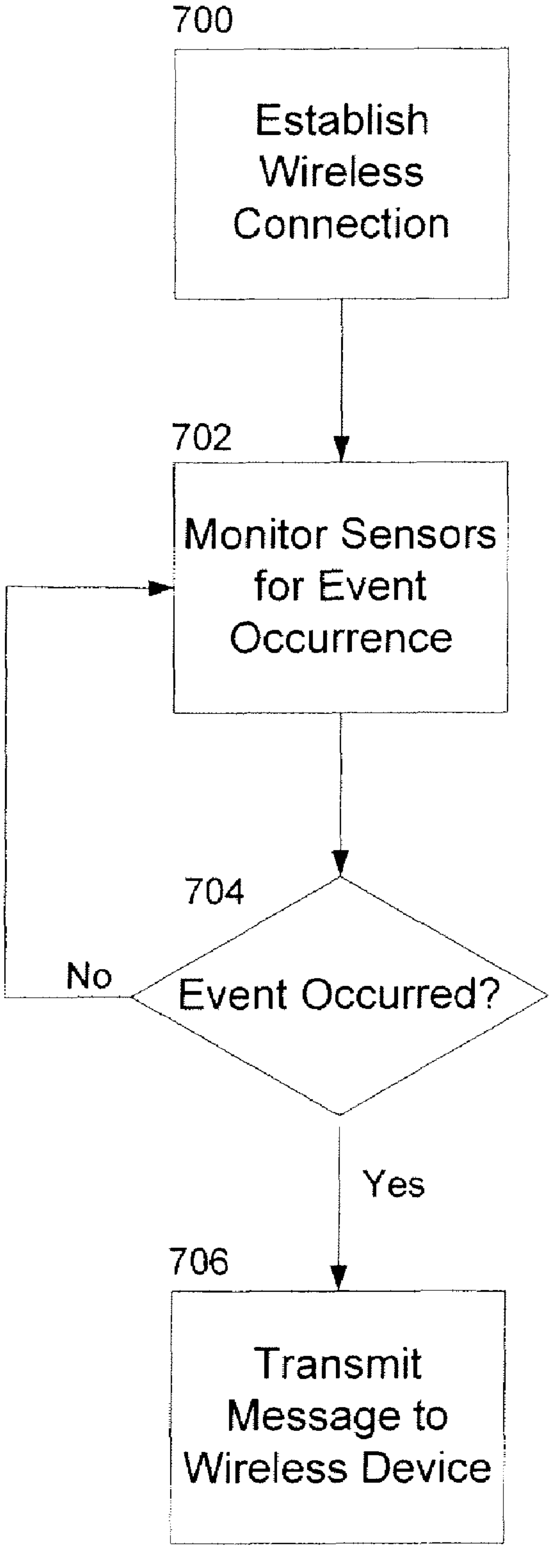
FIG. 7 illustrates a flow chart showing an exemplary process for monitoring a vehicle.

FIG. 7 illustrates a flow chart showing an exemplary process for monitoring a vehicle (such as for the above discussed crash detection). Initially, the user establishes 700 a wireless connection (e.g., a Bluetooth connection as discussed above) between a wireless device and the vehicle communication system. Once the connection is established, the vehicle communications system may monitor 702 any data received from the sensors (e.g., the three axis accelerometer). Once the vehicle communications system receives data from the sensors, the vehicle communications system may determine 704 whether an event has occurred or not. If no event has occurred, the process may return to monitoring 702 sensors for any event occurrences. If an event has occurred, a message may be transmitted 706 to the wireless device indicting an event has occurred.

One type of monitoring may be basic vehicle maintenance. By using additional sensors or monitoring information collected from the vehicle electronics and computer bus, various vehicle systems may be monitored for scheduled or required maintenance. For example, tire pressure may be monitored and a user notified when a tire's pressure has dropped below a certain threshold. Similarly, oil life, battery charge, alternator performance, brake systems, air bag status, odometer, coolant temperature, emissions, fuel miles per gallon, and many other vehicular systems may be monitored. The system may issue various alerts that may be maintenance related (e.g., change coolant, check oil), parameter based such as out of range (e.g., low battery voltage, low oil pressure), calendar based (e.g., annual inspection due, car payment due), mileage based (rotate tires, change oil), or a combination of the various types.

Another maintenance feature may be essentially taking a snapshot, or a listing of parameters, of the vehicle when the vehicle is operating at peak performance, and storing this snapshot in the wireless device or at a centralized server (e.g., the server 102 in FIG. 1) for later comparison in the future. Then, by comparing the current performance of the vehicle against the snapshot of the vehicle's parameters at peak performance, the current performance of the various vehicle systems may be quickly determined. Additional snapshots of the vehicle may be taken and stored either in the wireless device or at the server to provide a historical data set for the vehicle showing the performance of the vehicle over a certain time period (e.g., between oil changes).

A real-time snapshot may also be taken of the vehicle, and sent via a wireless device to either the vehicle manufacturer or to a maintenance facility. The snapshot may be analyzed and any required maintenance for the vehicle may be determined. In addition to a snap shot, the vehicle communications system may provide for live remote monitoring of data and information relating to the current performance levels of a vehicle.

By monitoring various performance parameters of the vehicle, additional features may be performed by the wireless device. For example, the wireless device may provide specific performance such as acceleration times (e.g., 0-60 MPH), braking times (e.g., 60-0 MPH), quarter mile distance times, horsepower/torque being produces by the engine, maximum speed, etc. By increasing the resolution of the sensors, more accurate measurements may be achieved. For example, using a higher resolution odometer may result in a more accurate measurement of distance. By integrating vehicle speed with the measurement of distance, distances such as the quarter mile may be accurately measured. Once these measurements are collected (e.g., acceleration times, distance times, etc.) a user may access a central server (e.g., the server 102) through their wireless device and post their measurements to a specific web site where the times, speeds, etc. may be compared to other vehicles. Additional information may be included with the reported data such as vehicle type or location to further customize the data posted to the web site. Another feature of performance monitoring is that results for various performance tests may be determined from recorded data rather than running each test in real time separately. For example, a user may just drive their car while the system continuously records performance information. After the user is done driving, software may analyze the recorded data and present the results to the driver. For example, during analysis, the software may determine three occasions where the vehicle accelerated from zero to sixty MPH and presents the results to the driver. Similarly, two occasions may be determined where the car did a quarter mile speed test. By providing performance analysis on recorded data, the user may be free to concentrate on driving and not on initializing tests.

By using similar parameters as discussed above with respect to vehicle performance, the wireless device may also function as a trip computer. Similar to most GPS devices, the wireless device may monitor distance traveled, distance remaining provided the user has entered a destination), current vehicle speed, estimated arrival time based upon current speed, average speed, estimated arrival time based upon average speed, etc.

The wireless device may also be used to alert a user as to their leasing summary (if the vehicle is leased). Using collected parameters from the OBMC, the wireless device may display to the user various statistics relating to the vehicle lease, for example, average miles driven per month, mile left of lease, lease end date, estimated date miles on lease will be exceeded, estimated number of miles the lease will be exceeded by, and how much it will cost to pay for the number of miles the least will be exceed by.

The wireless device may also be used to monitor and report the weather conditions where the vehicle is. Examples of reported parameters may include inside temperature, outside temperature, maximum temperature, minimum temperature, wind chill, and barometric pressure. In response to these reports, the user may take action to adjust the parameters. For example, if it is reported the inside temperature is higher than the user would like, the user may send a command to the vehicle to open the windows. Similarly, if the inside temperature drops too far, the user may send a command to close the windows or to turn on the heat.

A second type of monitoring may be monitoring other operators of a vehicle, for example, monitoring a teenage driver. If a parent leaves a wireless device connected to the communications system in the vehicle, reports may be sent to the wireless device indicating the performance of the vehicle while it is being operated by a teenage driver. Once the vehicle is returned, a parent may review the reports on the device to see how the teenage driver operated the vehicle. Or, for real time updates, a parent may leave a relay wireless device in the car, the wireless device may relay real-time performance data related to the operation of the vehicle to s server, and the server may send updates directly to the parent while the teenage driver is operating the vehicle.

By including additional sensors, parents may monitor additional parameters for a teenage driver. For example, sensors may be placed in each seat to determine how many passengers are in the vehicle. In many vehicles, this information is already determined by the air bag deployment systems. Sensors in the seats may determine if the seats are occupied, and this information may be sent via the vehicle electronics and computer bus. By monitoring this data, the vehicle communication system may monitor the number of occupants in the vehicle as well. Having additional people in the car is a leading cause of teenage accidents as the driver is distracted by the other people. By monitoring the number of people in the vehicle, a parent may also monitor the driving performance of the teenage driver during this time. By looking at other parameters, such as speed, braking, and the accelerometer data, a parent may see whether the teenage driver was speeding, braking hard, or swerving in the vehicle.

Similarly, a sensor may be used monitor stereo volume. Similar to having additional passengers, loud music is a leading cause of teenage accidents as the driver may be distracted and may be unable to hear warning signals from other vehicles such as horns or loud braking. Stereo volume may also be obtained in many vehicles from data sent over the vehicle electronics and computer bus.

Another feature included with teenage driver monitoring may be global position monitoring, provided the vehicle has a GPS. Based upon global position monitoring, a parent may monitor several parameters of vehicle performance during operation by a teenage driver. One parameter a parent may monitor may be the position of the car itself. A parent may set up a "geo-fence" in the monitoring software which is an outlined area on a map. Anytime the vehicle goes outside this area, an alert may be sent to the parent's wireless device. Similarly, a parent may take an instant snapshot showing where the vehicle is at any one moment in time. Also, the OBMC in the vehicle may continuously collect and send GPS data such that a complete map of where the vehicle was driven may be created. A parent may view this map on their wireless device, or the information may be sent to a server and the parent may access a web site where the map is displayed.

Additional sensors that may be included in the vehicle for monitoring teenage occupants are alcohol and smoke detectors. Alcohol detectors measure the air quality and can detect the presence of alcohol particles on a scale of parts-per-million. Smoke detectors function the same way, monitoring the air quality for smoke particles. As smoke detector technology increases, additional parameters may be detected as well, e.g., what specifically is being smoked.

It should be realized that these monitoring features do not merely apply to teenage drivers. Teenage drivers are shown merely by way of example. A similar system may be used for a rental car company to monitor how a vehicle is driven when rented by a specific person. Also, in the event of a crash, various parameters may be analyzed (e.g., speed, braking, stereo volume levels, alcohol sensor) to determine how the vehicle was being operated at the time of the crash. In the case of rental vehicles, rental companies may chose not to use the full functionality of the vehicle communications system. In this case, various events may be recorded in the device and retrieved on vehicle check-in. For example, if the vehicle has been in a minor accident a record of the G force event will be present in the recorded data.

A similar monitoring system may be used for monitoring a fleet of delivery trucks as is used for monitoring teenage drivers. Additional features may be included though, such as information specific to individual trips taken by a single vehicle. Information collected may include number of trips, miles per trip, total miles driven, stops per trip, time between stops, time taken for each stop, and geographical information such as route taken per trip.

Yet another example of a monitoring system may be a traffic network monitoring system. By receiving or sharing data between multiple vehicle communications systems, either by communicating directly between vehicle communications systems (e.g., via individual wireless devices) or by sending periodic reports to a central reporting agency and receiving a report on a wireless device, traffic and road conditions, weather and crash data may be monitored by anyone using the vehicle communications system. For example, all drivers in a certain city may share traffic, weather and road condition information such as what speed are vehicles travelling on a certain road, or how long are the delays on a certain highway. Speed may be automatically transmitted based on a periodic time and/or distance and sent to the central reporting agency where the information is stored on a server. The weather data and crash data also may be sent to the central reporting agency and similarly stored. As users drive, their position may be sent to the central reporting agency and any messages that apply to the vehicle (geographically specific) may be automatically uploaded from the server and sent from the central reporting agency to the vehicle. Traffic alerts then may be provided to the vehicle at certain intervals, e.g. at 1, 5, 10, 25 miles ahead as a warning. For example, the driver may be warned of a crash ahead in 25 miles at Exit 199. Alerts may be presented to the driver as either a text alert or an audio alert. An alert manager controls the types of alerts given to the driver, which ones will have audio, and which are only text. For example, based upon a driver requesting audio alerts regarding police, the system may present the audio alert "Police ahead in 5 miles, 20 minutes ago". The alert manager may also allow a user to determine a radius/distance notification and age of information parameters. Similarly, the alert manager may allow a driver to prioritize alerts. For example, a driver may prioritize a crash ahead over all other notifications. A user may also request an on-demand traffic report. A screen/mechanism is also provided for the user to click on an issue/problem and the issue type and GPS position is sent to the central reporting agency server. For example, weather related data such as fog, ice, snow, heavy rain, white-out, flooded, washout or tornado may be requested by a user and the user will receive an updated report from the central reporting agency specific to the geographic location of the user's vehicle. Other items such as police, traffic camera, accident, disabled vehicle, construction start and end, bad potholes, fire, etc. may be reported to a user. By providing a screen for users, this type and location of information may be shared easily. Users may also use this information to request assistance for themselves. By selecting an appropriate service (e.g., emergency, fire, medical, tow truck, etc.), a message is sent with a location indicator to the appropriate service. The information displayed on the screen may be color coded as well to indicate how recent the information is. For example, information received less than five minutes ago may be green, information five to fifteen minutes old may be yellow, and information older than fifteen minutes may be red. Not only are the geographic and traffic data used for alerts, but for creating maps to analyze traffic patterns, congestion, etc. The weather data may also be used for further analysis, such as by creating a temperature profile by analyzing all reported temperatures. Similarly, by analyzing all barometric pressures reported, a weather map may be constructed.

While several embodiments of the invention have been described herein by way of example in the above figures and accompanying disclosure, those skilled in the art will appreciate that various modifications, alterations, and adaptations to the described embodiments may be realized without departing from the spirit and scope of the invention defined by the appended claims.

What is claimed is:

1. A method of monitoring a vehicle, the method comprising:

establishing a first wireless connection between a first portable wireless device and a first vehicle communications system of a first vehicle thereby creating a data transfer network between the first portable wireless device and the first vehicle communications system;

monitoring, by the first vehicle communications system, at least one sensor for a specific first vehicle activity;

if the specific first vehicle activity occurs, sending a first sensor data via the wireless connection from the first vehicle communications system to the first portable wireless device via the data transfer network;

storing the first sensor data in a monitor database; and providing a user report based at least in part on the first sensor data, wherein the user report is further based on a second sensor data from a second vehicle.

2. The method of claim 1, wherein the specific first vehicle activity includes at least one of a crash alert, a vehicle performance alert, a vehicle maintenance alert, or a traffic condition alert.

3. The method of claim 2, wherein the specific first vehicle activity includes a first vehicle performance alert that includes at least one of vehicle speed, engine temperature, distance traveled, or geographic location.

4. The method of claim 2, wherein the specific first vehicle activity includes a vehicle maintenance alert that includes at least one of fuel remaining, tire pressure, oil quality, emissions test results, or brake conditions.

5. The method of claim 2, wherein the specific first vehicle activity includes a traffic condition alert that includes at least one of road conditions, traffic speed, or traffic volume.

6. The method of claim 5, wherein the traffic condition alert is transmitted by the first wireless device to a traffic network monitoring system.

7. The method of claim 1, wherein providing the user report comprises comparing the first sensor data with the second sensor data.

8. The method of claim 1, wherein the first vehicle has a characterization and the second vehicle has the characterization.

9. The method of claim 8, wherein the characterization comprises one or more of the following: a make, a model, a year of manufacture, an owner, and a total mileage.

10. The method of claim 1, wherein the first vehicle has a first location and the second vehicle has a second location, and a distance between the first location and the second location is less than a required distance.

11. The method of claim 10, wherein the user report comprises a report of traffic conditions within a neighborhood of less than the required distance around the first vehicle.

12. The method of claim 11, wherein the report of traffic conditions is available to a user of a central reporting agency having access to the monitor database.

13. The method of claim 10, wherein:

the first sensor data and the second sensor data comprise one or more of an exterior temperature, an exterior barometric pressure, and a wind chill; and the user report comprises a report of weather conditions within a neighborhood of less than the required distance around the first vehicle.

14. The method of claim 13, wherein the report of weather conditions is available to a user of a central reporting agency having access to the monitor database.

* * * * *